United States Patent
Doria

(10) Patent No.: US 11,237,069 B2
(45) Date of Patent: Feb. 1, 2022

(54) DIFFERENTIAL PRESSURE SENSOR FOR DETERMINING A DIFFERENTIAL PRESSURE VALUE AND AN ABSOLUTE PRESSURE VALUE

(71) Applicant: Endress+Hauser SE+Co. KG, Maulburg (DE)

(72) Inventor: Patrick Doria, Berlin (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 0 days.

(21) Appl. No.: 16/980,156

(22) PCT Filed: Feb. 15, 2019

(86) PCT No.: PCT/EP2019/053850
§ 371 (c)(1),
(2) Date: Sep. 11, 2020

(87) PCT Pub. No.: WO2019/174858
PCT Pub. Date: Sep. 19, 2019

(65) Prior Publication Data
US 2021/0010889 A1    Jan. 14, 2021

(30) Foreign Application Priority Data

Mar. 14, 2018 (DE) .................... 10 2018 105 867.5

(51) Int. Cl.
*G01L 13/02* (2006.01)
*G01L 9/00* (2006.01)
*G01L 19/00* (2006.01)

(52) U.S. Cl.
CPC ............ *G01L 13/025* (2013.01); *G01L 9/008* (2013.01); *G01L 19/0046* (2013.01)

(58) Field of Classification Search
None
See application file for complete search history.

(56) References Cited

U.S. PATENT DOCUMENTS

| 4,135,408 A | 1/1979 | Di Giovanni |
| 4,329,877 A | 5/1982 | Hershey |
| (Continued) | | |

FOREIGN PATENT DOCUMENTS

| CN | 2093392 U | 1/1992 |
| DE | 19608321 A1 | 8/1997 |
| (Continued) | | |

*Primary Examiner* — Andre J Allen
*Assistant Examiner* — Jermaine L Jenkins
(74) *Attorney, Agent, or Firm* — Christopher R. Powers; Endress+Hauser (USA) Holding Inc.

(57) ABSTRACT

A differential pressure sensor for determining a differential pressure value, comprising: a differential pressure measuring transducer having a measuring membrane; a membrane seal having a membrane seal body including a pressure chamber filled with a transmission fluid in which a filling body having a recess is arranged, wherein the differential pressure measuring transducer arranged in the recess, wherein a first pressure is applied to the differential pressure measuring transducer on a first measuring membrane side and a second pressure is applied to a second measuring membrane side such that deformation of the measuring membrane represents a differential pressure value between the first pressure and the second pressure, wherein a piezoelectric layer for determining an absolute pressure value of the first pressure is provided inside the pressure chamber.

9 Claims, 4 Drawing Sheets

(56) References Cited

U.S. PATENT DOCUMENTS

| | | | | |
|---|---|---|---|---|
| 2007/0234813 A1* | 10/2007 | Hedtke | ............... | G01L 19/0645 |
| | | | | 73/706 |
| 2014/0021563 A1* | 1/2014 | Tham | .................... | G01L 19/143 |
| | | | | 257/415 |

FOREIGN PATENT DOCUMENTS

| | | | | |
|---|---|---|---|---|
| DE | 102004019222 A1 | | 11/2005 | |
| DE | 102006057829 A1 * | | 6/2008 | ........... G01L 13/025 |
| DE | 102008019054 A1 | | 11/2009 | |
| DE | 102011002900 A1 | | 7/2012 | |
| DE | 102018121446 A1 * | | 3/2020 | ........... G01L 19/142 |
| WO | 2012098136 A1 | | 7/2012 | |
| WO | 2015162113 A1 | | 10/2015 | |

\* cited by examiner

DIFFERENTIAL PRESSURE SENSOR FOR DETERMINING A DIFFERENTIAL PRESSURE VALUE AND AN ABSOLUTE PRESSURE VALUE

CROSS-REFERENCE TO RELATED APPLICATIONS

The present application is related to and claims the priority benefit of German Patent Application No. 10 2018 105 867.5, filed on Mar. 14, 2018 and International Patent Application No. PCT/EP2019/053850, filed on Feb. 15, 2019, the entire contents of which are incorporated herein by reference.

TECHNICAL FIELD

The invention relates to a differential pressure sensor for determining a differential pressure value.

BACKGROUND

Differential pressure sensors are used for detecting differential pressures and are used in industrial measuring technology. There, they are used for level measurement or flow measurement, for example. For level measurement, for example, the difference between a first pressure at the bottom of a container and a second pressure above the filling material is measured. The difference is proportional to a fill-level-dependent hydrostatic pressure in the container, and thus to the fill level. For flow measurement, for example, a flow resistance is used in a line, and a difference between a first high-pressure-side pressure before the resistance and a second low-pressure-side pressure after the resistance is determined by means of a differential pressure measurement sensor. This differential pressure is a measure of the flow through the line.

In pressure measuring technology, so-called semiconductor differential pressure transducers, e.g., silicon chips with doped resistance elements, are often used as pressure-sensitive elements. Corresponding differential pressure transducers typically comprise a measuring membrane, one side of which is exposed to a first pressure and the other side of which is exposed to a second pressure during measuring operation. The pressures involved create a deflection of the measuring membrane, which corresponds to the differential pressure to be measured. Semiconductor pressure transducers are usually very sensitive and are, thus, not exposed directly to the medium whose pressure is to be detected. Instead, membrane seals filled with a transfer fluid are installed upstream.

To this end, membrane seals frequently have a solid, typically multi-part, membrane-seal body on which two separating membranes are externally arranged in parallel to and opposite one another. In this case, one of the separating membranes closes a first pressure receiving chamber which is connected via a first hydraulic path to a pressure chamber in which the differential pressure transducer is arranged in such a way that the pressure acting on this separating membrane is supplied to a first side of the measuring membrane. Correspondingly, the other one of the separating membranes closes a second pressure receiving chamber via which the pressure acting on this separating membrane is supplied to a second side of the measuring membrane by means of a second hydraulic path. The differential pressure transducer can thus determine the differential pressure value on the basis of the two pressures supplied.

More frequently, however, it is desirable for a so-called static pressure of the medium to be determined in addition to the differential pressure value. For this purpose, the differential pressure sensors are designed such that, in addition to the differential pressure transducer for determining the differential pressure, they also have an absolute pressure transducer for determining an absolute pressure of one of the two pressures acting on the separating membrane.

A disadvantage of this variant is that by integrating two pressure transducers, the structure and connection technology becomes complex and thus expensive. In this variant, too, an increased amount of transfer fluid is required since the corresponding pressure must be supplied to both pressure transducers. An increased amount of transfer fluid in turn has the disadvantage that the measurement performance of the pressure sensor, especially, with respect to the differential pressure determination, is impaired.

SUMMARY

It is thus an object of the invention to propose a differential pressure sensor which can determine both a differential pressure value and an absolute pressure value and can be produced cost-effectively.

The object is achieved according to the invention by the differential pressure sensor according to claim 1.

The differential pressure sensor according to the invention for determining a differential pressure value comprises:
a differential pressure transducer having a measuring membrane and a circuit for converting a pressure-dependent deformation of the measuring membrane into the differential pressure value,
a membrane seal having a membrane-seal body in which is located a pressure chamber which is filled with a transfer fluid and in which a filling body with a recess is arranged in order to fill cavities between walls of the pressure chamber and the differential pressure transducer arranged in the recess, wherein a first and a second hydraulic path each extend through the membrane-seal body between a first opening and a second opening, wherein the first openings are each closed with a first separating membrane which can have a first pressure or a second pressure applied in order to introduce the first pressure into the first hydraulic path and the second pressure into the second hydraulic path, wherein the first hydraulic path opens at the second opening in the pressure chamber so that the first pressure is applied to the measuring membrane of the differential pressure transducer on a first measuring membrane side, wherein the second pressure is applied to a second measuring membrane side at the second opening via the second hydraulic path so that the deformation of the measuring membrane represents the differential pressure value between the first pressure and the second pressure, wherein a piezoelectric layer is provided within the pressure chamber to determine an absolute pressure value of the first pressure.

According to the invention, it is therefore proposed that a piezoelectric layer is introduced within the pressure chamber so that the absolute pressure value of the first pressure prevailing in the pressure chamber or the so-called static pressure of the medium can be determined. Commonly, the first pressure is understood to be the pressure of the high-pressure side, the absolute pressure value of which is also determined accordingly. However, the invention is not restricted by whether the first pressure with respect to the present disclosure represents the pressure of the high-pressure side or the pressure of the low-pressure side.

In comparison with the variant known from the prior art, piezoelectric layers have the advantage that they are easier to integrate and, since these materials can also be produced by semiconductor processes nowadays, are also more economical at the same time. Although a precise measurement, as is possible, for example, with an absolute pressure transducer that is specially produced for this purpose, is not yet achievable nowadays, the precision already achieved today for determining the static pressure or the absolute pressure value by means of the piezoelectric layer is nevertheless sufficient. Differential pressure sensors according to the invention also offer the advantage of operating with less transfer fluid since no additional pressure transducer is required. Furthermore, with the differential pressure sensors according to the invention, it is possible to reduce the size in comparison with the two-chip variants known from the prior art.

An advantageous embodiment of the differential pressure sensor according to the invention provides that the piezoelectric layer is at least partially applied to at least one wall of the pressure chamber and/or of the filling body.

A further advantageous embodiment of the differential pressure sensor according to the invention provides that a first electrically conductive layer for deriving a first electrical signal of a first side of the piezoelectric layer is applied between the wall of the pressure chamber or of the filling body and the piezoelectric layer, wherein the piezoelectric layer is applied to the electrically conductive layer and the electrically conductive layer is exposed at least in sections so that the first electrical signal of the first side of the piezoelectric layer can be derived via at least one contacting surface.

A further advantageous embodiment of the differential pressure sensor according to the invention provides that a second electrical layer for deriving a second electrical signal of a second side of the piezoelectric layer is applied to the piezoelectric layer, wherein the second electrical signal is derived via bonding wires which are fixed on the second electrical layer.

A further advantageous embodiment of the differential pressure sensor according to the invention provides that the filling body comprises an electrically non-conductive material, especially, a glass, a plastic, a ceramic.

A further advantageous embodiment of the differential pressure sensor according to the invention provides that the piezoelectric layer substantially completely covers the wall of the pressure chamber or of the filling body.

A further advantageous embodiment of the differential pressure sensor according to the invention provides an evaluation unit to which the first and second electrical signals are supplied and which is configured to determine the absolute pressure value of the first pressure on the basis of the first and second electrical signals.

A further advantageous embodiment of the differential pressure sensor according to the invention provides that, in the event that the piezoelectric layer at least partially covers or is applied to the side wall of the pressure chamber, an insulation layer is provided between the wall and the piezoelectric layer.

BRIEF DESCRIPTION OF THE DRAWINGS

The invention is explained in more detail based upon the following drawings. The following is shown.

DETAILED DESCRIPTION

Figure 1:
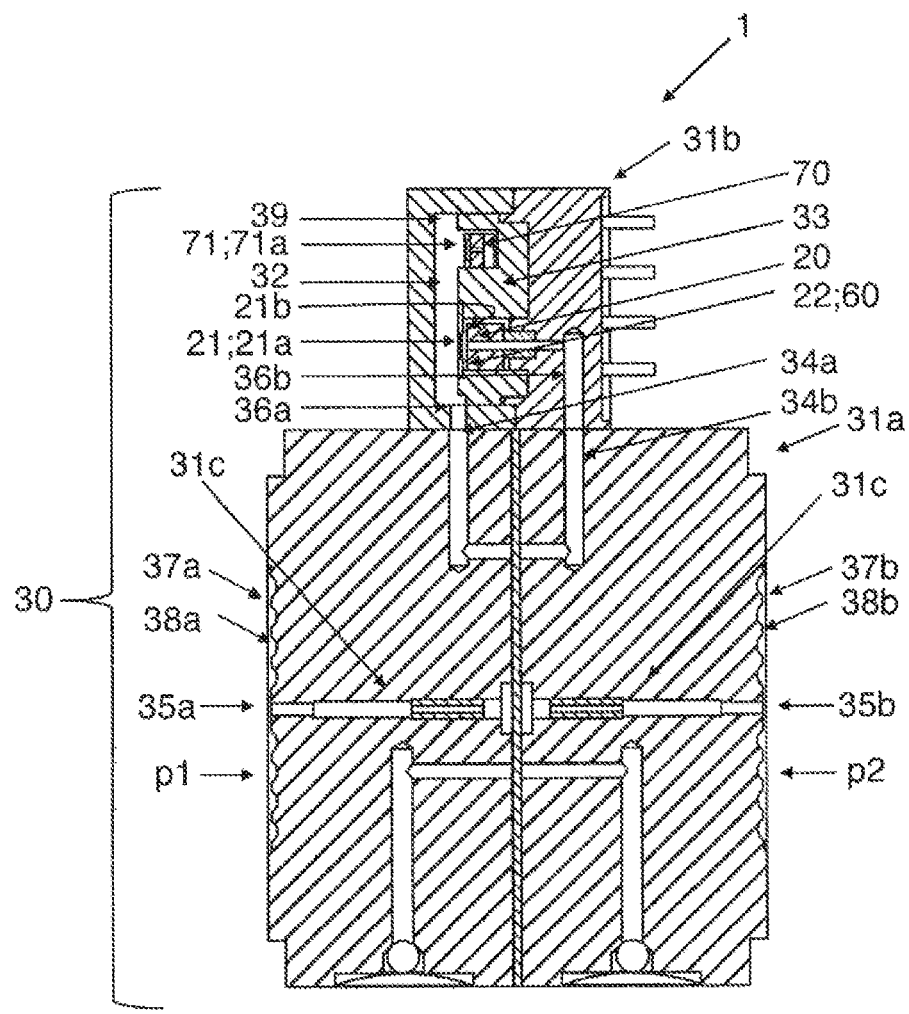
FIG. 1 shows a section of a structure of a differential pressure sensor known from the prior art.

FIG. 1 shows a section of a structure of a differential pressure sensor known from the prior art. This differential pressure sensor comprises a membrane seal 30 with a membrane-seal body 31a, 31b, 31c constructed from a plurality of parts and a differential pressure transducer 20 and an absolute pressure transducer 70, both of which are designed as semiconductor pressure transducers. In the example shown in FIG. 1, the membrane-seal body 31 comprises a substantially solid block 31a made of a metal, especially, of steel or stainless steel, and a carrier body 31b which serves as a carrier for the two pressure transducers 20, 70. The solid block 31a has a first separating membrane 37a on one side surface and a first separating membrane 37b on a side surface opposite the first side surface. The two first separating membranes 37a and 37b each enclose a first pressure receiving chamber 38a, 38b integrated externally into the solid block. During the actual measuring operation, a first pressure p1 acts on the side of the first separating membrane 37a facing away from the solid block 31a or a second pressure p2 acts on the side of the other first separating membrane 37b facing away from the solid block 31a. Both pressures p1 and p2 are represented by way of example by an arrow in FIG. 1. The two pressures p1 and p2 are guided to the two pressure transducers 20, 70 via a first and a second hydraulic path 34a, 34b respectively. For this purpose, the first hydraulic path 34a extends from a first opening 35a of the first pressure receiving chamber 38a through the solid block 31a via a capillary tube system 31c to a second opening 36a in the carrier body 31b. The first hydraulic path 34a thus opens via the second opening 36a into a pressure chamber 32 which is integrated in the carrier body 31b and supplies the first pressure p1 to a front side 21a of a measuring membrane 21 of the differential pressure transducer 20. Both the pressure chamber 32 and the first hydraulic path 34a are filled with a transfer fluid 39 for transmitting the corresponding pressure.

In order to keep the volume of the transfer fluid 39 in the pressure chamber 32 as low as possible, the differential pressure sensor 1 also has a filling body 33 introduced into the pressure chamber 32. The filling body 33 fills cavities between the walls of the pressure chamber and the pressure transducers 20, 70 which are each embedded in a recess in the filling body 33.

The second hydraulic path 34b extends from the first opening 35b of the first pressure receiving chamber 38b in turn through the solid block 31a via a capillary tube system 31c to a second opening 36b in the carrier body 31b. The second opening 36b is provided in the carrier body 31b such that the second pressure p2 transmitted via the second hydraulic path 34b is supplied to a rear side 21b of the measuring membrane 21 of the differential pressure transducer 20. For this purpose, the second hydraulic path 34b is likewise filled with the transfer fluid 39.

The measuring membrane 21 experiences a pressure-dependent deflection due to the first pressure p1 acting on the front side 21a of the measuring membrane 21 and the second pressure p2 acting on the rear side 21b of the measuring membrane 21. The pressure-dependent deflection can in turn be detected metrologically, for example, by piezoresistive elements integrated in the measuring membrane 21 so that a differential pressure value can be determined by a circuit 22 for converting the pressure-dependent deflection. Alternatively, instead of the piezoresistive elements, capacitive elements may also be used for metrologically measuring the pressure-dependent deflection.

Furthermore, the first pressure p1 is also guided via the pressure chamber 32 to a front side 71a of a measuring membrane 71 of the absolute pressure transducer so that the measuring membrane 71 also experiences a deflection which is dependent on the first pressure p1 and which in turn can be detected metrologically in order to determine an absolute pressure measurement value.

The structure shown in FIG. 1 indicates that an increased outlay in terms of the structure and connection technology is necessary for integrating two pressure transducers 20, 70. Both pressure transducers, which are usually designed as semiconductor pressure transducers, must thus be introduced into the filling body. This means that they must be correspondingly placed, aligned, and subsequently fixed, e.g., glued. In particular, when placing the pressure transducers relative to one another, it is also necessary to observe potential clearance specifications with respect to explosion protection measures.

However, not only does the structure and connection technology suffer from such a structure, the dimensions of the pressure chamber also have to be large enough for both pressure transducers to have space therein. This means that a relatively large volume has to be filled with the transfer fluid, which in turn leads to the differential pressure sensor, especially, the differential pressure transducer, suffering performance losses from a metrological perspective.

Figure 2:
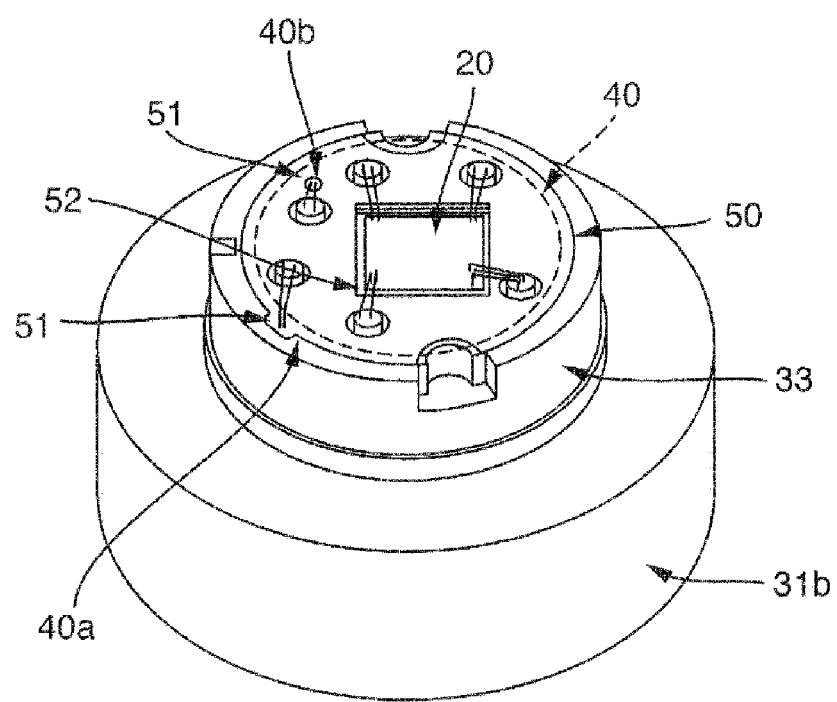
FIG. 2 shows a first exemplary embodiment of a carrier body of a differential pressure sensor according to the present disclosure.

FIG. 2 shows a first exemplary embodiment of a carrier body 31b of a differential pressure sensor according to the invention. In contrast to the example shown in FIG. 1, the differential pressure sensor has no absolute pressure transducer in the form of a semiconductor component. Rather, the filling body integrated in the pressure chamber of the carrier body has a piezoelectric layer 40 for determining the first pressure p1. In the example shown in FIG. 2, the piezoelectric layer 40 is applied substantially to the entire area of a side surface or wall of the filling body.

For electrically contacting the piezoelectric layer 40, a first electrically conductive layer 50 is provided, which was applied to the side surface or wall of the filling body 33 before the piezoelectric layer 40 was applied. In order to be able to tap a first electrical signal from the piezoelectric layer 40, the first electrically conductive layer 50 has at least one projection defined in sections as contacting surface 51. As shown in FIG. 2, the projection can be designed in such a way that both layers are designed to be substantially circular, wherein the piezoelectric layer 40 has a smaller diameter than the first electrically conductive layer 50 so that an edge region is formed as a projection and thus as a contacting surface 51. The edge region is shown by way of example in FIG. 2 by the dashed circle. Additionally or alternatively, the first electrically conductive layer 50 can have a further projection which is exposed in sections and is designed such that it projects beyond the piezoelectric layer not on all sides, as is the case with the circular projection, but rather only in a locally limited region.

Bonding wires for electrical contacting can be fixed to the contacting surface 51, for example, so that the first electrical signal of a first side (rear side) of the piezoelectric layer 40 can be tapped.

For example, a second electrical signal may be derived such by attaching bonding wires to a second electrically conductive layer 53 which serves as the electrode and which is arranged on a second side (front side) of the piezoelectric layer 40.

The first and second electrical signals are supplied to an evaluation unit 70, especially, a correspondingly configured microprocessor, which is configured to determine an absolute pressure value of the first pressure p1 or a so-called static pressure pstat of the medium on the basis of the first and second electrical signals. The evaluation unit 70 may be designed, for example, as part of the circuit 20 for converting the pressure-dependent deformation of the measuring membrane or separately therefrom.

Figure 3:
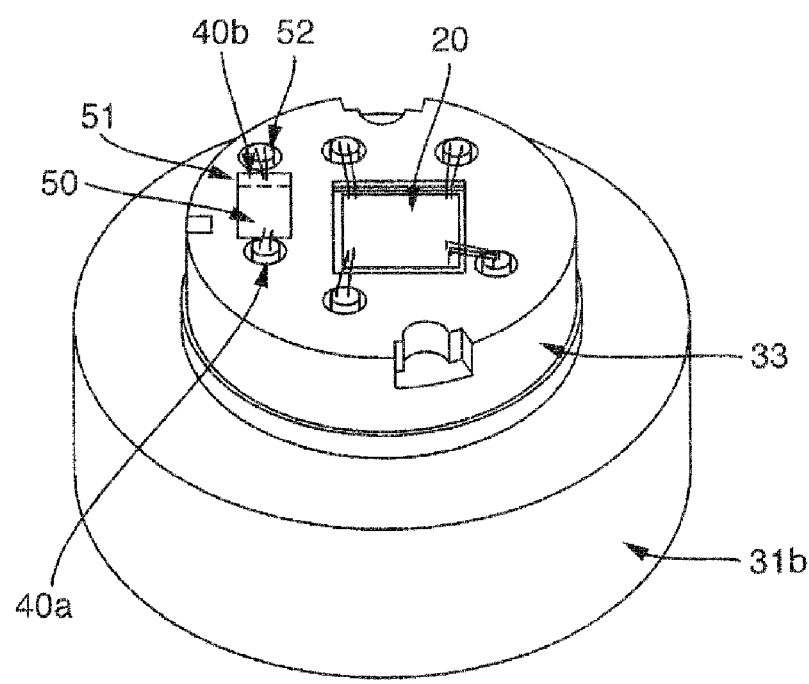
FIG. 3 shows a second exemplary embodiment of a carrier body of a differential pressure sensor according to the present disclosure.

FIG. 3 shows a second exemplary embodiment of a carrier body of a differential pressure sensor according to the invention, in which, in contrast to the example shown in FIG. 2, the piezoelectric layer 40 is substantially applied to a side surface or wall of the filling body not over the entire area but rather covers the side surface or wall of the filling body only in sections or partially. FIG. 2 and FIG. 3 each show the covering of a wall of the filling body 33. However, it is also conceivable that the piezoelectric layer 40 at least partially covers a side wall of the pressure chamber 32 which is not a wall of the filling body 33. In the event that the piezoelectric layer covers the side wall of the pressure chamber, an insulation layer may be provided between the side wall and the piezoelectric layer. Furthermore, the invention also does not preclude the piezoelectric layer covering both a wall of the pressure chamber 32 partially and a wall of the filling body 33 partially.

Regarding the further design of the second exemplary embodiment, especially, the possibilities for electrically contacting the piezoelectric layer 40, reference is made to the first exemplary embodiment.

Figure 4:
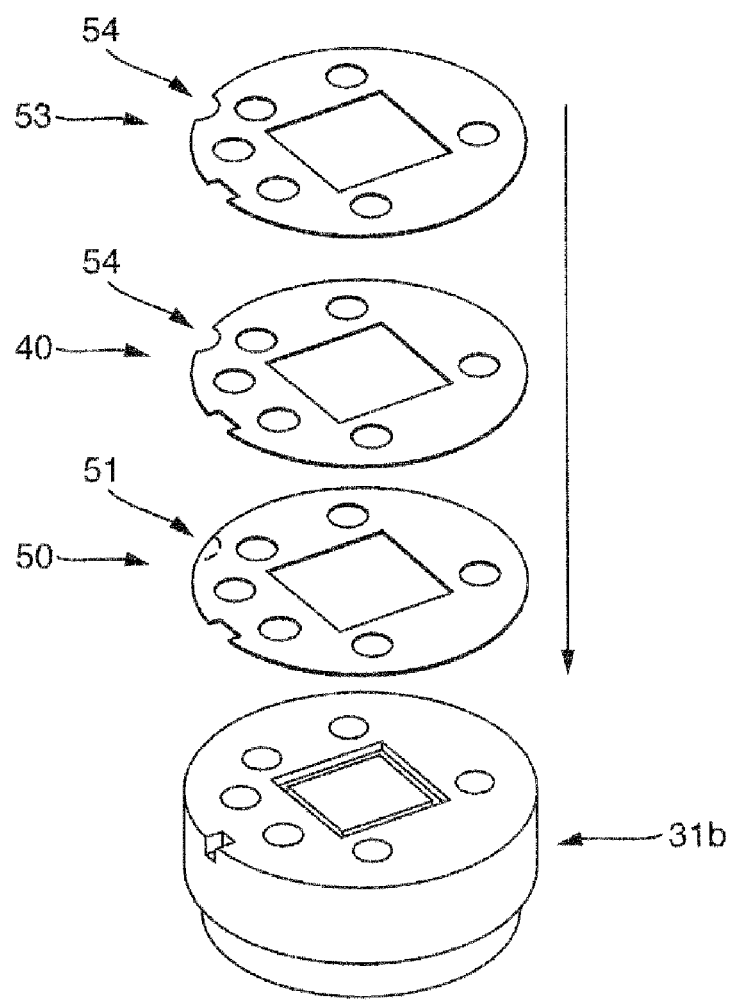
FIG. 4 shows an exemplary partial layer structure of a differential pressure sensor according to the present disclosure.

FIG. 4 shows an exemplary partial layer structure of a differential pressure sensor according to the invention for clarification of a possibility of electrically contacting the piezoelectric layer 40. The layer structure shown in FIG. 4 comprises the first electrically conductive layer 50 which serves as the first electrode and which is arranged on the wall of the carrier body 31b, the piezoelectric layer 40 arranged thereon, and a second electrically conductive layer 53 serving as the second electrode. In order to be able to tap the first electrical signal from the piezoelectric layer 40, the first electrically conductive layer 50 has at least one projection which is defined in sections and serves as a contacting surface 51. Contrary to the example shown in FIG. 2, the projection is designed such that the piezoelectric layer 40 and the second electrically conductive layer 53 have a corresponding recess 54 so that the first electrically conductive layer 50 is exposed at least in sections. Other variants not shown in FIG. 4 for exposing the first electrically conductive layer in sections are, for example, holes located in the two layers 40, 53.

The invention claimed is:

1. A differential pressure sensor for determining a differential pressure value, the sensor comprising:
   a differential pressure transducer including a measuring membrane and a circuit configured to convert a pressure-dependent deformation of the measuring membrane into a differential pressure value;
   a membrane seal comprising:

a membrane seal body including a pressure chamber, which is filled with a transfer fluid, and a filling body including a recess in which the differential pressure transducer is disposed, wherein the filling body is adapted to fill cavities between walls of the pressure chamber and the differential pressure transducer, wherein a first hydraulic path and a second hydraulic path each extend through the membrane seal body between first openings and second openings of the first hydraulic path and the second hydraulic path, respectively, wherein the first openings are each covered with first separating membranes, respectively, which are configured to have a first pressure or a second pressure applied thereto, in operation, as to introduce the first pressure into the first hydraulic path and the second pressure into the second hydraulic path, wherein the first hydraulic path opens at its respective second opening into the pressure chamber such that the first pressure is applied to the measuring membrane of the differential pressure transducer on a first measuring membrane side, and wherein the second pressure is applied to a second measuring membrane side of the measuring membrane via the respective second opening of the second hydraulic path such that the pressure-dependent deformation of the measuring membrane represents the differential pressure value between the first pressure and the second pressure; and a piezoelectric layer disposed within the pressure chamber and configured to determine an absolute pressure value of the first pressure.

2. The sensor of claim 1, wherein the piezoelectric layer is at least partially applied to at least one wall of the pressure chamber and/or of the filling body.

3. The sensor of claim 1, wherein a first electrically conductive layer is disposed between the wall of the pressure chamber and the piezoelectric layer and/or between the filling body and the piezoelectric layer as to derive a first electrical signal of a first side of the piezoelectric layer, wherein the piezoelectric layer is applied to the first electrically conductive layer, and wherein the first electrically conductive layer is exposed at least in sections such that the first electrical signal of the first side of the piezoelectric layer can be derived via at least one contacting surface of the piezoelectric layer.

4. The sensor of claim 3, wherein a second electrically conductive is disposed adjacent the piezoelectric layer and configured to enable deriving a second electrical signal of a second side of the piezoelectric layer, wherein the second electrical signal is derived via bonding wires affixed on the second electrical layer.

5. The sensor of claim 3, wherein the filling body comprises an electrically non-conductive material.

6. The sensor of claim 5, wherein the filling body comprises a glass, a plastic or a ceramic.

7. The sensor of claim 3, further comprising an evaluation unit to which the first electrical signal and the second electrical signal are supplied, wherein the evaluation unit is configured to determine the absolute pressure value of the first pressure based on the first electrical signal and the second electrical signal.

8. The sensor of claim 1, wherein the piezoelectric layer substantially completely covers at least one wall of the pressure chamber and/or of the filling body.

9. The sensor of claim 1, wherein the piezoelectric layer at least partially covers or is applied to at least one wall of the pressure chamber, and wherein an insulation layer is disposed between the at least one wall and the piezoelectric layer.

* * * * *